(12) United States Patent
Matsumoto et al.

(10) Patent No.: US 11,459,167 B2
(45) Date of Patent: Oct. 4, 2022

(54) POUCH CONTAINER CONTAINING A BEVERAGE AND EXTERIOR SHEET MATERIAL THEREFOR

(71) Applicant: Naturan International Co., Ltd., Ayauta-Gun (JP)

(72) Inventors: Shigeki Matsumoto, Ayauta-Gun (JP); Hideharu Tominaga, Suita (JP); Katuhiro Arai, Takamastu (JP); Tsuyoshi Shiga, Ayauta-Gun (JP)

(73) Assignee: Naturan International Co., Ltd., Ayauta-Gun (JP)

( * ) Notice: Subject to any disclaimer, the term of this patent is extended or adjusted under 35 U.S.C. 154(b) by 543 days.

(21) Appl. No.: 14/910,236

(22) PCT Filed: Aug. 4, 2014

(86) PCT No.: PCT/JP2014/070443
§ 371 (c)(1),
(2) Date: Feb. 4, 2016

(87) PCT Pub. No.: WO2015/019984
PCT Pub. Date: Feb. 12, 2015

(65) Prior Publication Data
US 2016/0185517 A1    Jun. 30, 2016

(30) Foreign Application Priority Data

Aug. 5, 2013  (JP) ............................. JP2013-162153

(51) Int. Cl.
*B65D 85/73* (2006.01)
*B65D 75/58* (2006.01)
(Continued)

(52) U.S. Cl.
CPC ................ *B65D 85/73* (2013.01); *A23L 2/54* (2013.01); *B32B 27/18* (2013.01); *B65D 65/40* (2013.01);
(Continued)

(58) Field of Classification Search
CPC ....... A23L 2/54; B65D 65/40; B65D 75/5883; B65D 85/73
See application file for complete search history.

(56) References Cited

U.S. PATENT DOCUMENTS 3,658,562 A * 4/1972 Wilson ...................... A23L 3/10
                                                           383/44
2008/0311225 A1* 12/2008 Shiga ..................... C02F 1/4606
                                                           424/682
(Continued)

FOREIGN PATENT DOCUMENTS

JP    2003-10865    1/2003
JP    2003-24956    1/2003
(Continued)

OTHER PUBLICATIONS

English Translation of JP 2009-227300 A.*
(Continued)

*Primary Examiner* — Stephanie A Cox
(74) *Attorney, Agent, or Firm* — Morrison & Foerster LLP (57) ABSTRACT

A pouch container generating hydrogen water is provided. A beverage containing at least water and a hydrogen generating substance that reacts with water to generate hydrogen gas are contained in a pouch container that is sealed. Even when hydrogen in a gas form leaks from a sealed part or the like of the pouch container to the outside, new hydrogen gas is generated by the reaction of the water and the hydrogen generating substance in the pouch container. Hydrogen
(Continued)

water having sufficient hydrogen gas dissolved therein can be provided even after the long-term preservation. For example, the hydrogen generating substance may be contained in a straw or may be kneaded into an exterior sheet material.

4 Claims, 6 Drawing Sheets

(51) Int. Cl.
| | |
|---|---|
| B32B 27/18 | (2006.01) |
| B65D 81/24 | (2006.01) |
| A23L 2/54 | (2006.01) |
| B65D 65/40 | (2006.01) |
| B65D 75/26 | (2006.01) |

(52) U.S. Cl.
CPC ......... *B65D 75/5883* (2013.01); *B65D 81/24* (2013.01); *A23V 2002/00* (2013.01); *B32B 2264/107* (2013.01); *B65D 75/26* (2013.01)

(56) References Cited

U.S. PATENT DOCUMENTS

2013/0323129 A1* 12/2013 Carmichael .......... B65D 81/267
 422/162
2016/0220445 A1* 8/2016 Matsumoto ............... A61J 1/10

FOREIGN PATENT DOCUMENTS

| JP | 2004-330028 | 11/2004 |
|---|---|---|
| JP | 2004-344777 | 12/2004 |
| JP | 2004-344783 | 12/2004 |
| JP | 2009-173532 | 8/2009 |
| JP | 2009-227300 | 10/2009 |
| JP | 2009-286431 | 12/2009 |
| JP | 2010-207802 | 9/2010 |
| JP | 2011-136727 | 7/2011 |
| JP | 2011-240959 | 12/2011 |
| JP | 2011-255360 | 12/2011 |
| JP | 5068392 | 8/2012 |
| JP | 5111675 | 10/2012 |
| JP | 2013-49461 | 3/2013 |
| WO | WO-2008/090354 | 7/2008 |
| WO | 2010/116192 A1 | 10/2010 |
| WO | WO-2012/104632 | 8/2012 |

OTHER PUBLICATIONS

English Translation fo JP 2004-344777 A.*
International Search Report and Written Opinion dated Nov. 4, 2014, directed to International Application No. PCT/JP2014/070443; 7 pages.
International Preliminary Report On Patentability dated Feb. 9, 2016, directed to International Application No. PCT/JP2014/070443; 1 page.
European Search Report dated Jun. 22, 2016, directed to International Application No. PCT/JP2014070443; 7 pages.

* cited by examiner

POUCH CONTAINER CONTAINING A BEVERAGE AND EXTERIOR SHEET MATERIAL THEREFOR

CROSS-REFERENCE TO RELATED APPLICATIONS

This application is a national phase filing under 35 U.S.C. §371 of International Application No. PCT/JP2014/070443, filed Aug. 4, 2014, and which claims priority to Japanese Patent Application No. 2013-162153, filed on Aug. 5, 2013, the contents of which prior applications are incorporated herein by reference.

FIELD OF THE INVENTION

The present invention relates to a pouch container containing a beverage and an exterior sheet material therefor.

BACKGROUND OF THE INVENTION

Hydrogen water is recently attracting a lot of attention in view of health maintenance and enhancement or the like. Hydrogen water is thus sold with a container within which the hydrogen water is filled.

Meanwhile, a pouch container is used as a container containing a beverage, as disclosed by Patent Literature 1. It is known that a pouch container is formed of a flexible exterior sheet material as a sealed container. A beverage inside the pouch container is squeezed and drunk while an openable part thereof is opened. Such a pouch containers has a straw integrated therewith in most cases. The mouth of the pouch container is covered with a cap while one end of the straw is exposed to the outside as the mouth and the other end of the straw is positioned inside the pouch container. In this case, when the cap is opened to open the pouch container, a beverage in the pouch container can be drunk easily through the mouth.

Furthermore, hydrogen-reduced water containing reduced hydrogen ($H^-$) has attracted attention in various fields. For example, utilization of hydrogen-reduced water has been considered for anti-oxidation, cleansing, makeup, preventing and treating skin diseases, and the like. Drinking hydrogen-reduced water is also expected to reduce active oxygen in body.

As disclosed by Patent Literatures 2 to 4, hydrogen-reduced water containing reduced hydrogen ($H^-$) can be easily generated by causing the reaction of a hydrogen-reactive substance such as metal magnesium with water without using an electrolysis apparatus or the like. That is, for example, reduced hydrogen is generated in a process in which water and metal magnesium react with each other to become magnesium hydroxide and hydrogen gas. To make hydrogen-reduced water easily available, Patent Literature 4 discloses that a water-permeable bar-like cartridge filled with magnesium powder is placed inside a container such as a pet bottle filled with water.

PATENT LITERATURE

Patent Literature 1: Japanese laid-open patent application No. 2013-49461
Patent Literature 2: Japanese laid-open patent application No. 2004-330028
Patent Literature 3: Japanese laid-open patent application No. 2003-10865
Patent Literature 4: Japanese laid-open patent application No. 2003-24956

SUMMARY OF THE INVENTION

To drink hydrogen water easily, hydrogen water including hydrogen gas dissolved therein can be contained within a pouch container. However, hydrogen gas generated from the hydrogen water in the pouch container may leak to the outside through a sealed part (a connection part) of an exterior sheet material constituting the outer frame of the pouch container, a sealed part of a straw integrated with the pouch container, or a microspace of a cap. That is, in the actual situation, when the pouch container is opened for drinking hydrogen water, almost no hydrogen gas remains dissolved or hydrogen gas remains dissolved at an extremely low concentration in the hydrogen water in the pouch container. A pouch container virtually cannot provide hydrogen water having sufficient hydrogen gas dissolved therein. Particularly, providing reduced-hydrogen water in a pouch container is virtually more impossible because reduced hydrogen is inherently likely to disappear quickly.

The present invention has been made in view of the above circumstances. The first object of the present invention is to provide a beverage-containing pouch container that can provide hydrogen water having sufficient hydrogen gas dissolved therein in a pouch container.

The second object of the present invention is to provide an exterior sheet material for constituting a pouch container that is suitable for constituting the above pouch container.

To achieve the above first object, the present invention applies to a first solution below. That is, as recited in the Claim 1, the pouch container is sealed and contains a beverage including at least water and a hydrogen generating substance which is reactive with water, the pouch container comprises a straw integrated with the pouch container, the straw having one end communicated with the inside of the pouch container and the other end forming a mouth portion disposed outside the pouch container, the mouth portion is covered with a cap, and the beverage in the pouch container can be taken out through the mouth portion by removing the cap, and the hydrogen generating substance is contained in the straw.

According to the above solution, even when hydrogen in gas form leaks from a sealed part or the like of the pouch container to the outside, new hydrogen gas is generated by the reaction of the water and the hydrogen generating substance in the pouch container. Accordingly, hydrogen water having sufficient hydrogen gas dissolved therein can be provided even after the long-term preservation.

Furthermore, hydrogen water can be easily drunk simply by removing the cap of the straw. The above solution is also preferable for using a general pouch container structure as it is, for example.

Moreover, the hydrogen generating substance can be kept contained in the pouch container by using the inner space of the straw effectively.

Preferable aspects based on the above solution are as recited in Claims 2 to 4.

The hydrogen generating substance contained within the straw is in the form of a ceramic member formed by sintering a mixture of the hydrogen generating substance and a mineral substance (as corresponding to Claim 2). This feature is preferable for making the handling of the pouch container easy, e.g., for making the filling operation into the pouch container easy, by using the ceramic formed of the hydrogen generating substance and the mineral substance. Whether the ceramic is certainly filled in the pouch container can be confirmed by sound generated when the pouch container is shaken. Thus, this feature is preferable also for preventing at least one of the hydrogen generating substance and the mineral substance from failing to be filled in the pouch container, for example. Moreover, this feature is preferable also for promoting the contact of the ceramic and water by shaking of the pouch container immediately before drinking to generate high-concentration reduced-hydrogen water.

an other-end opening part is formed at said other end of the straw, and a side-surface opening part is formed on the side surface of the straw so that the inside of the straw is in communication with the inside of the pouch container through the other-end opening part and the side-surface opening part, the ceramic member is contained into the straw through the other-end opening part of the straw, a locking member preventing the ceramic member from slipping off from the other-end opening part is attached to the other end part of the straw, and the ceramic member has a size which does not allow the ceramic to slip off from the side-surface opening part.

(as corresponding to Claim 3). With this feature, the ceramic can be easily contained in the straw while the existing straw structure is effectively used.

The hydrogen generating substance is metal magnesium, and the mineral substance is calcium (as corresponding to Claim 4). With this feature, specific preferable substances are provided as the hydrogen generating substance and the mineral substance, respectively.

To achieve the above objects, the present invention applies to a second solution below. That is, as recited in Claim 5, the pouch container is sealed and contains a beverage including at least water and a hydrogen generating substance which is reactive with water to generate hydrogen gas and the hydrogen generating substance is kneaded in a surface of an exterior sheet constituting the pouch container, the surface being in contact with the water in the beverage.

According to the above solution, the hydrogen generating substance can be automatically contained in the pouch container simply by forming the pouch container with the exterior sheet material.

To achieve the above objects, the present invention applies a third solution below. That is, as recited in Claim 6, the pouch container is sealed and contains a beverage including at least water and a hydrogen generating substance which is reactive with water to generate hydrogen gas the pouch container is formed of an exterior sheet having an inner sheet and an outer sheet laminated directly on the outside of the inner sheet, the hydrogen generating substance is kneaded in the outer sheet, and the inner sheet has fine holes which do not permit liquid water to pass therethrough and permits water vapor to pass therethrough.

According to the above solution, the hydrogen generating substance can be automatically contained in the pouch container simply by forming the pouch container with the exterior sheet material, and the above solution is preferable for setting desirable performance of generating hydrogen gas by using the fine holes of the inner sheet, for example.

To achieve the above second object, the present invention applies a solution below. That is, as recited in the Claim 7, an exterior sheet material for constituting a pouch container containing a beverage including at least water, wherein a hydrogen generating substance reactive with water to generate hydrogen gas is kneaded in a surface to be brought into contact with water in the pouch container when the pouch container is formed.

According to the above solution, the exterior sheet material for forming the pouch container according to Claim 5 is provided.

To achieve the above second object, the present invention applies to a solution below. That is, as recited in the Claim 8, an exterior sheet material for constituting a pouch container containing at least water, wherein the exterior sheet constituting the pouch container includes an inner sheet and an outer sheet laminated directly on the outside of the inner sheet, wherein the hydrogen generating substance is kneaded in the outer sheet, and wherein the inner sheet has fine holes which does not permit liquid water to pass therethrough and permits water vapor to pass therethrough.

With this feature, the exterior sheet material for constituting the pouch container according to the Claim 6 is provided.

According to the present invention, while hydrogen water having hydrogen gas dissolved at a sufficient concentration therein can be preserved for a long time with use of a pouch container, immediate supply of the hydrogen water is allowed as needed, and further, the handling is easy.

DETAILED DESCRIPTION OF THE INVENTION

Figure 1:
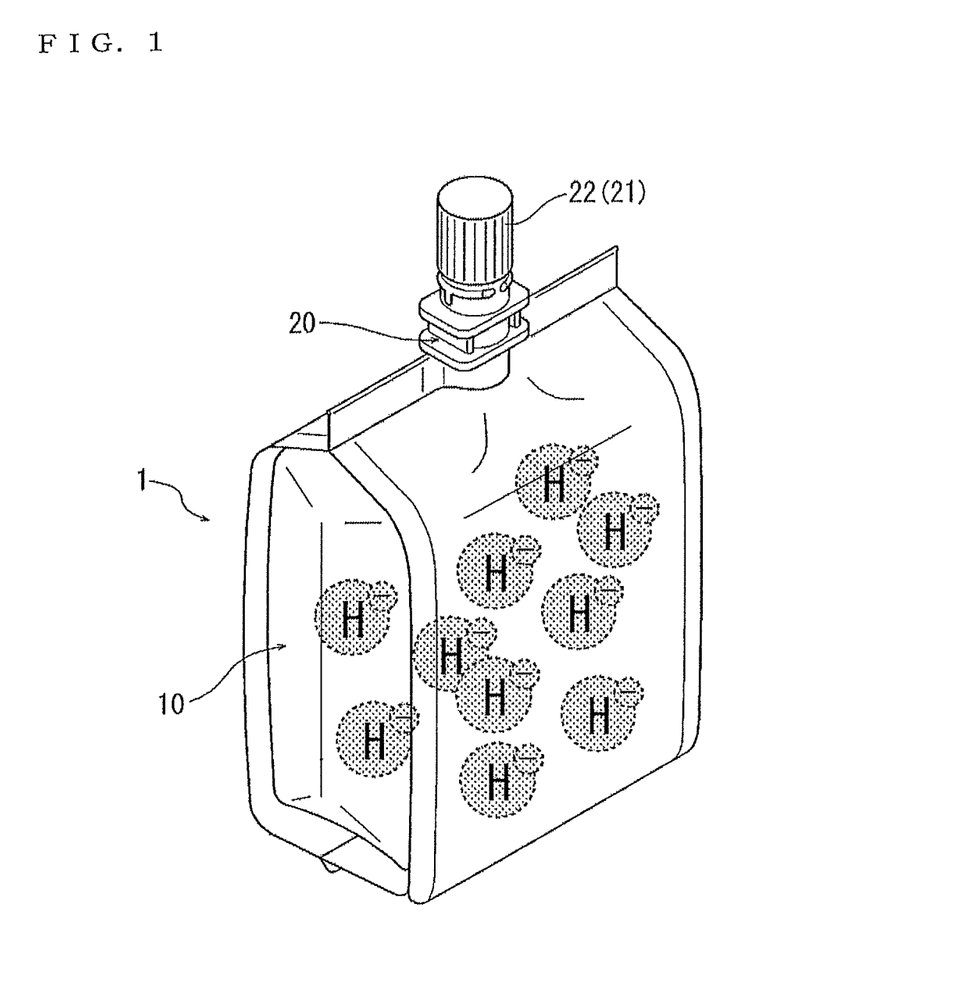
FIG. 1 is a perspective view of a pouch container to which the present invention is applied.

FIG. 1 illustrates a pouch container 1 that is assembled by integrating a container main body 10 and a straw 20. For example, the container main body 10 is formed as a sealed container by sealing (connecting) four exterior sheet materials forming front, rear, right, and left surfaces at the outer peripheral edges of the exterior sheet materials.

The straw 20 has one end exposed to the outside of the container main body 10 and the other end inserted in the container main body 10. As a matter of course, a connection part between the container main body 10 and the straw 20 is also sealed. The one end of the straw 20 that is exposed to the outside is a mouth 21. The mouth 21 is normally covered with a cap 22. The aforementioned respective sealed parts and (the microspace of) the covered part with the cap 22 can prevent liquid from passing therethrough completely but can fail to prevent hydrogen gas from passing therethrough.

What are contained in the pouch container 1, that is, the container main body 10 are described below. First, purified water that is beverage having impurities sufficiently removed therefrom is contained in the container main body 10.

Figure 2:
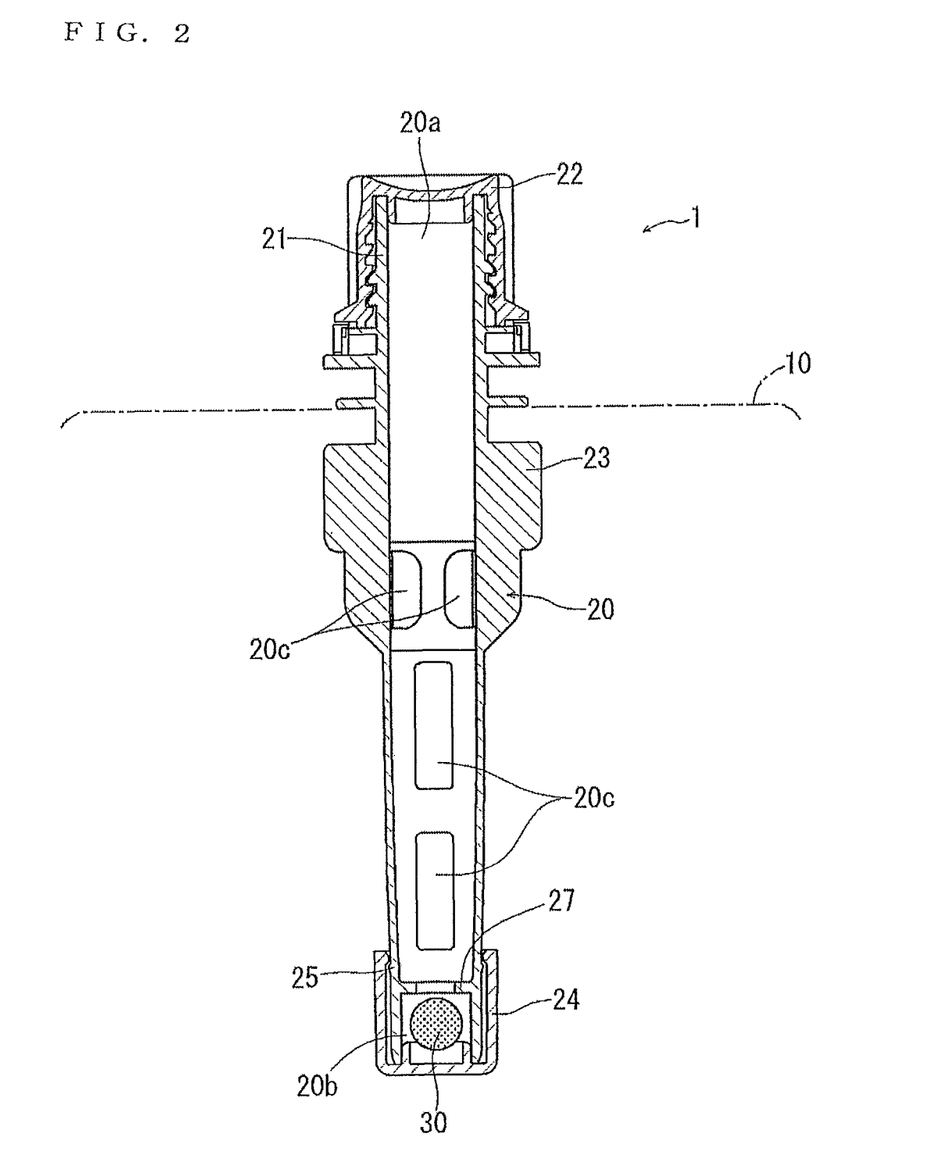
FIG. 2 is a sectional view illustrating a straw integrated with the pouch container in FIG. 1 and a ceramic contained in the straw.

A ceramic ball 30 formed of a spherical ceramic is further contained in the container main body 10 (see FIG. 2). The ceramic ball 30 contains a hydrogen generating substance (which is metal magnesium in the embodiment) and a mineral substance (which is calcium in the embodiment) for generating mineral ions. More specifically, the ceramic ball 30 is obtained by sintering the kneaded mixture of metal magnesium powder and calcium powder.

The purified water and the ceramic ball 30 are filled in the pouch container 1 before the pouch container 1 is sealed. FIG. 1 illustrates a state where the mouth 21 is covered with the cap 22 while the purified water and the ceramic ball 30 have been contained in the pouch container 1.

In the state in FIG. 1, calcium eluted from the ceramic ball 30 becomes positively charged calcium ions and the calcium ions are dissolved in the purified water. The metal magnesium that comprises the ceramic ball 30 reacts with the purified water to generate magnesium hydroxide and hydrogen gas. In this hydrogen gas generating process, reduced hydrogen is generated. The reduced hydrogen is adsorbed by the calcium ions. After a predetermined time has passed and the above reaction has proceeded sufficiently, the purified water as a beverage becomes reduced-hydrogen water containing reduced hydrogen (is changed to reduced-hydrogen water). Even when hydrogen gas including reduced-hydrogen gas gradually leaks from the pouch container 1, new hydrogen gas including reduced-hydrogen gas is generated. Accordingly, the purified water can be preserved as reduced-hydrogen water in the pouch container 1 for a long time (for example, for three years).

To drink the reduced-hydrogen water in the pouch container 1, a person may drink the reduced-hydrogen water from the mouth 21 while squeezing the container main body 10 with a hand or fingers after removing the cap 22.

Figure 3:
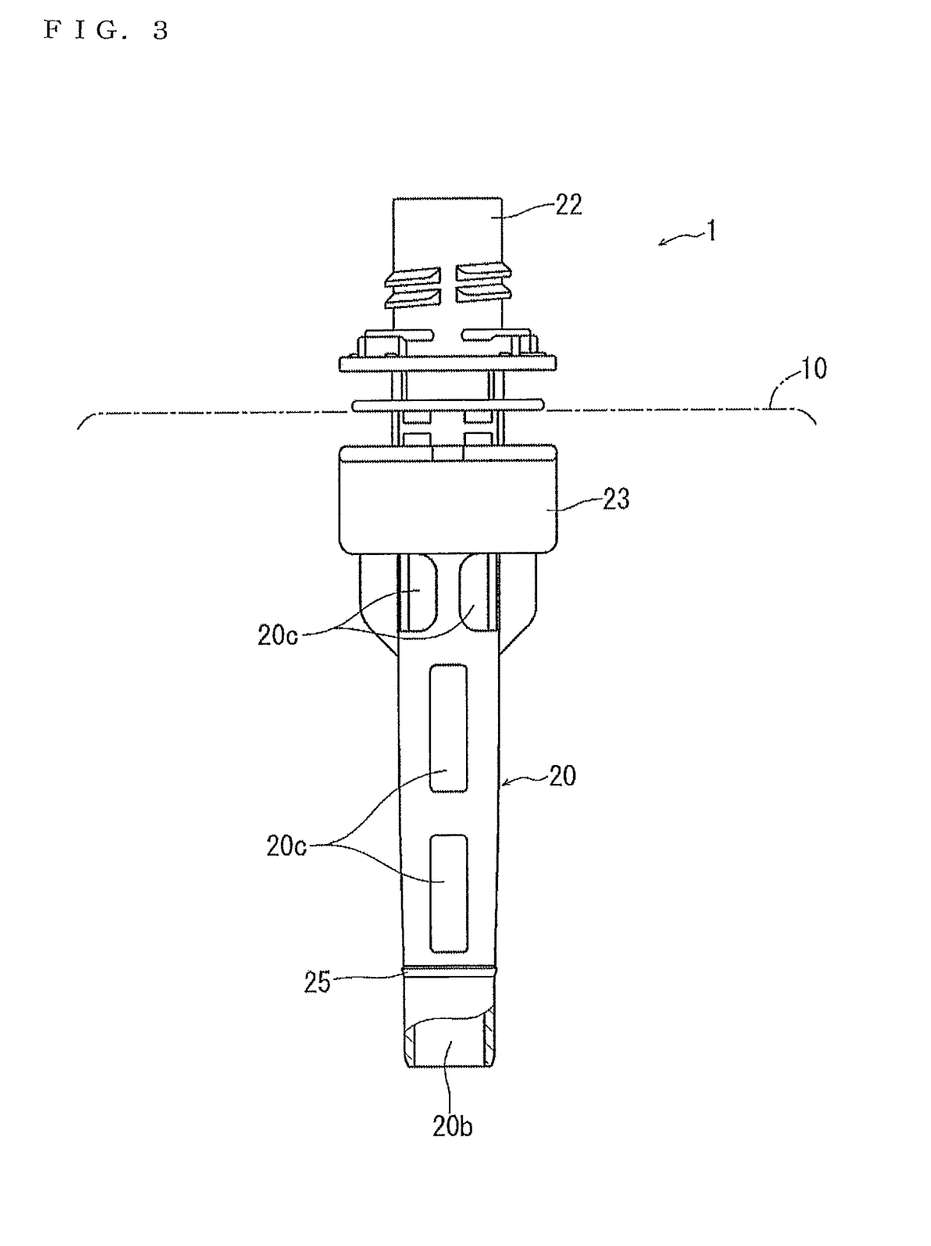
FIG. 3 is a partial sectional side view illustrating the straw in FIG. 1 with a cap and a locking member removed therefrom.

In the embodiment, the ceramic ball 30 is contained in the straw 20. This point is described with reference to FIGS. 2 and 3. FIG. 2 illustrates a state where the ceramic ball 30 is contained in the straw 20. FIG. 3 illustrates a state before the ceramic ball 20 is contained.

The straw 20 has a long cylindrical shape made of synthetic resin with one end (the upper end) and the other end (the lower end) opened. A one-end opening part 20a at the one-end side of the straw 20 is an opening part of the mouth 21. Reference character 20b denotes an other-end opening part.

FIGS. 2 and 3 illustrate a connection part (a sealed part) 23 with (an exterior sheet material constituting) the container main part 10. A lower part than the connection part 23 in FIGS. 2 and 3 is inserted (positioned) in the container main body 10.

The straw 20 has a plurality of side-surface opening parts 20c at positions lower than the connection part 23 and higher than the other-end opening part 20b. The diameter of the ceramic ball 30 is smaller than the inner diameter of the other-end opening part 20b. The ceramic ball 30 is contained into the straw 20 through the other-end opening part 20b.

A locking member 24 having a cap-like shape is engaged with the other end of the straw 20. The locking member 24 restricts the slip-off of the ceramic ball 30 from the other-end opening part 20b of the straw 20. That is, an engaging projection 25 is formed on the outer peripheral surface of the other end of the straw 20 and the locking member 24 is engaged with the engaging projection 25 while blocking the other-end opening part 20b. Accordingly, falling-off from the straw 20 is restricted. The locking member 24 can be integrated with the straw 20 by an appropriate method such as a method of bonding the locking member 24 to the straw 20 with an adhesive.

The side-surface opening parts 20c each have a long hole shape with a width smaller than the diameter of the ceramic ball 30. That is, the ceramic ball 30 is prohibited from slipping off from the side-surface opening parts 20c to the outside of the straw 20. A restricting wall part 27 is formed on the inner wall of the straw 20 so as to be positioned directly above the ceramic ball 30. The restricting wall part 27 restricts the unnecessary movement of the ceramic ball 30 toward the mouth 21 side.

In a state where the ceramic ball 30 is contained in the straw 20 and the locking member 24 is integrated with the straw 20 in advance, the ceramic ball 30 is mounted to the container main body 1. That is, when the straw 20 is mounted to the container main body 1, the ceramic ball 30 is automatically contained in the container main body 10. Subsequently, after the container main body 1 is filled with purified water through the mouth 21. Subsequently, the mouth 21 is covered with the cap 22. The purified water in the container main body 1 enters the straw 20 through the side opening parts 20c and contacts with the ceramic ball 30 (hydrogen water containing reduced hydrogen is generated). In some embodiments, a small hole may be formed on the locking member 24 to cause the purified water to enter toward the ceramic ball 30 through the small hole.

Figure 4:
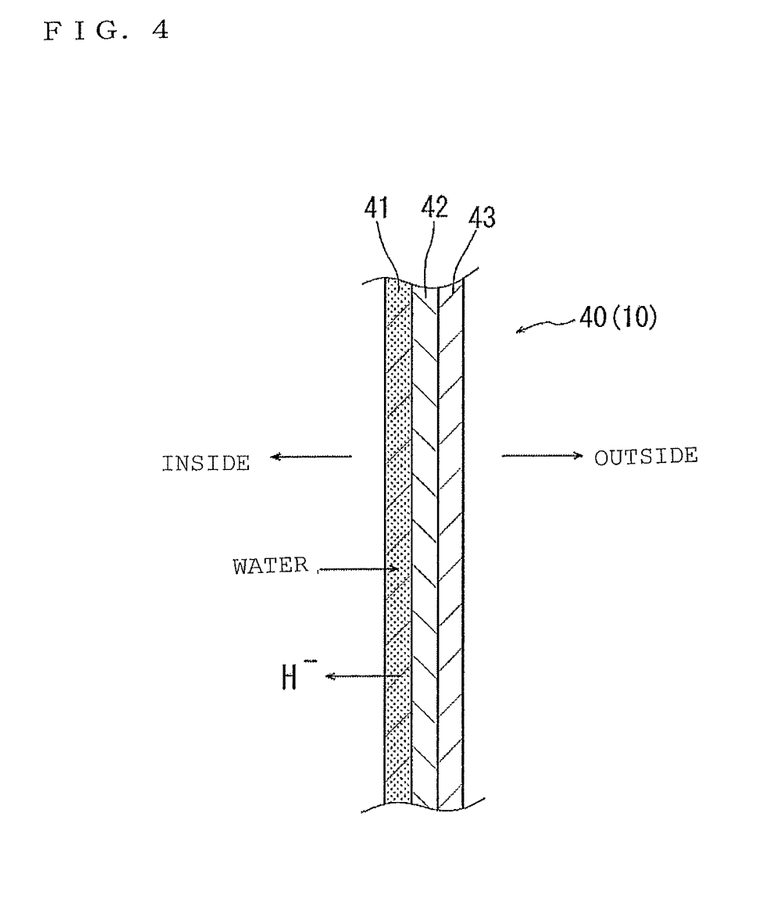
FIG. 4 illustrates another embodiment of the present invention and is a sectional view of a main part of an exterior sheet material.

FIG. 4 illustrates another example of containing (filling) a hydrogen generating substance in the pouch container 1 and illustrates an example where a hydrogen generating substance is kneaded into an exterior sheet material 40 constituting the outer frame of the container main body 1. The exterior sheet material 40 is configured by laminating three sheet materials that are a first layer sheet 41, a second layer sheet 42, and a third layer sheet 43 in order from the inner side to the outer side of the exterior sheet material 40. The first layer sheet 41 servers as a sealant substrate and is formed of, e.g., PP (polypropylene), PE (polyethylene), or PET (polyethylene terephthalate). The second layer sheet 42 serves as a barrier substrate and is formed of e.g., AL (aluminum foil). The third layer sheet 43 servers as a main substrate and is formed of, e.g., PET or NY (nylon).

For example, a hydrogen generating substance that is fine powder having the same components as those of the ceramic ball 30 is kneaded in the first layer sheet 41. Accordingly, purified water in the pouch container 1 constituted of the exterior sheet material 40 reacts with the hydrogen generating substance kneaded in the first layer sheet 41 to generate reduced-hydrogen water.

Figure 5:
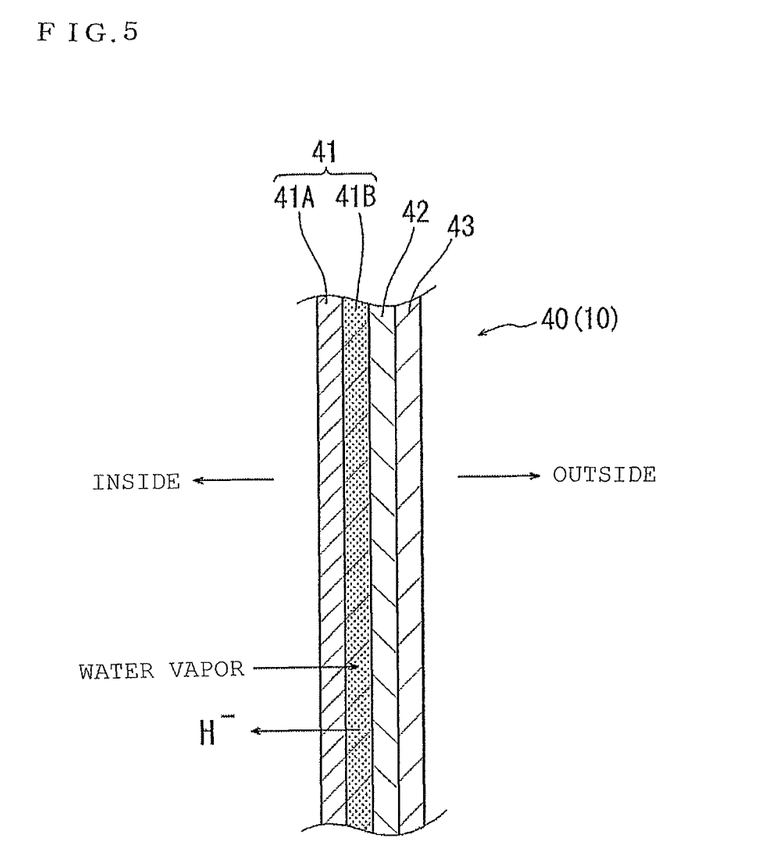
FIG. 5 illustrates a modification of FIG. 4 and is a sectional view of a main part of an exterior sheet material.

FIG. 5 illustrates a modification of FIG. 4. That is, in FIG. 4, the first layer sheet 41 has a double-layer structure constituted of an inner sheet 41A and an outer sheet 41B. A hydrogen generating substance is kneaded in the outer sheet 41B. The inner sheet 41A has fine holes that do not permit water (liquid water) to pass therethrough but permit water vapor to pass therethrough (sheets that permit only water vapor to pass therethrough have been commercially available). The present modification is preferable for controlling an amount of hydrogen gas to be generated in the pouch container 1 per unit time (is suitable for generating hydrogen gas slowly).

Figure 6:
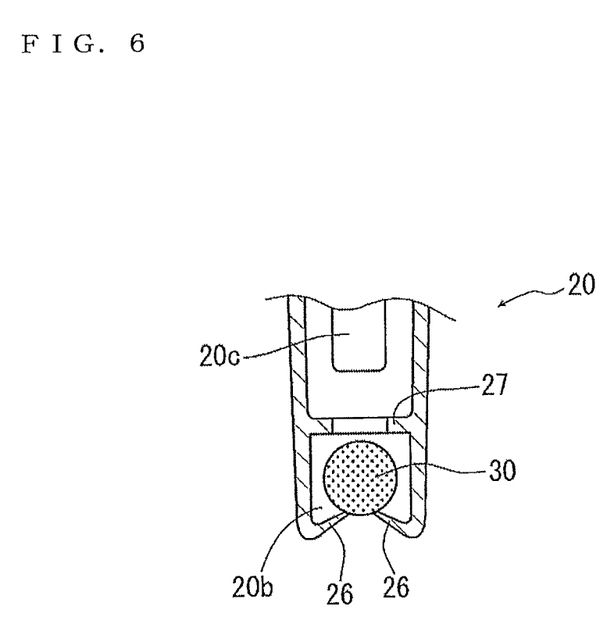
FIG. 6 illustrates a modification of FIG. 2 and is a sectional view of a main part of the vicinity of an other-end opening part of the straw.

FIG. 6 illustrates a modification of FIG. 2 that is an example of containing the ceramic ball 30 into the straw 20 without using the locking member 24 separately. That is, engaging claws 26 are integrated with the straw 20 by folding the other end of the straw 20 toward an inner side in the diameter direction and toward the one end side. A plurality (for example, three to four) of the engaging claws 26 are formed at intervals in the circumferential direction. An interval between the respective ends of the engaging claws 26 is smaller than the diameter of the ceramic ball 30.

The ceramic ball 30 is contained into the straw 20 through the other-end opening part 20b by deforming the engaging claws 26 elastically. After being contained into the straw 20, the engaging claws 26 restrict the ceramic ball 30 from slipping off from the other-end opening part 20b.

To verify that purified water 20 in the pouch container 1 is reduced-hydrogen water (containing reduced hydrogen), experiments that are described below were conducted. An amount of purified water in the pouch container 1 was 200 cc, the diameter of the ceramic ball 40 was 5 mm, the weight of metal magnesium that was a component of the ceramic ball 30 was 30 mg, the weight of calcium sulfite that was a component of the ceramic ball 30 was 100 mg, the weight of the other components in the ceramic ball 30 was 30 mg. One ceramic ball having the above components was put into the pouch container 1. The pouch container 1 immediately after twenty four hours had passed since sealing of the purified water and the ceramic ball 30 was used (an amount of hydrogen remaining dissolved in the purified water could not be detected before being sealed in the pouch container 1 and the amount was 1.0 ppm or more at a time point at which twenty four hours had passed since the achievement of the state in FIG. 1).

First, an oxidation-reduction reagent was prepared with hydrogen peroxide water and iodine mixed liquid. Drops of the appropriate amount of the oxidation-reduction reagent were added to a nonwoven fabric to generate a light-brown pseudo oxidation stain. When the purified water in the pouch container 1 was thrown over the oxidation stain, the stain turned colorless within a few seconds (it was verified that the purified water was reduced-hydrogen water having reduction action).

Next, the whole of a nonwoven fabric was immersed in the oxidation-reduction reagent in a beaker and the whole of the nonwoven fabric changed into a light-brown color due to oxidation stains was prepared. When the purified water in the pouch container 1 was thrown on the diagonal line of the nonwoven fabric, only an area over which the purified water was thrown turned colorless (it was verified that the purified water was reduced-hydrogen water having reduction action).

The oxidation-reduction reagent was put into a beaker and drops of the purified water were put from the pouch container 1 onto the oxidation-reduction reagent in the beaker. Immediately after the drops were put, the droplets collided against the liquid surface and the oxidation-reduction reagent became entirely clouded with bubbles. After the oxidation-reduction reagent was left to stand for approximately ten seconds, the bubbles disappeared and the reagent entirely became colorless (it was verified that the purified water 20 was reduced-hydrogen water having reduction action).

Required time for generating hydrogen and an amount of the generated hydrogen vary depending on the pH value of water to be made to react with a mineral substance in the pouch container 1. For example, when a ceramic containing a mixture of metal magnesium and calcium is used, water having a lower pH value (acid) reacts more quickly to shorten the required time for generating hydrogen. Even when a ceramic containing a mixture of metal magnesium and calcium and water having a high pH value (alkaline) are used, the required time for generating hydrogen can be shortened by dissolving other minerals such as potassium or sodium having catalytic action, titanium, or iron in the water. When iron or the like that is minerals different from metal magnesium and calcium is used as a reactant, the reactant is hard to use in terms of the practicality not only because water having a higher pH value (alkaline) shortens the required time for generating hydrogen more but also because the reaction rate of iron and water is extremely low.

Water to be made to react with a mineral substance in the pouch container 1 is preferably purified water with no impurities. The impurities herein are mostly organic matters. Water having inorganic matters (minerals) dissolved therein promotes reaction (electron transfer) between the water and the ceramic (that is, promotes generation of hydrogen) because such water increases the dissolved energy amount (the ion concentration) in the liquid and serves as reactive water with high conductivity. Water having inorganic matters (minerals) dissolved therein such as natural groundwater (drinking water or hot spring water) can also provide the same effects. The dissolved minerals have a function of retaining generated reduced hydrogen ($H^-$) and hydrogen molecules ($H_2$) in the liquid by binding to the reduced hydrogen ($H^-$) and hydrogen molecules ($H_2$). When water contains organic matters such as an extract of animals and plants but the mass concentration of the contained organic matters is 1% or less, the organic matters have less influence on the generation and retention of hydrogen. When water having a high concentration of organic matters is used, it suffices that generation of hydrogen is promoted by control of the pH value and the dissolved amount of minerals.

The embodiments have been described above. However, the present invention is not limited to the embodiments and can be modified as appropriate within the scope of the claims. The hydrogen generating substance is not limited to metal magnesium. For example, an appropriate substance such as a nickel catalyst, pure calcium (metal calcium), ion exchange resin can be used as the hydrogen generating substance. In addition, for example, an appropriate substance such as sodium and potassium can be used as the mineral substance. In some embodiment, one large ceramic ball 30 is contained. In other embodiments, a plurality of the small ceramic balls 30 are contained. A ceramic that functions as the ceramic ball 30 is not limited to a sphere shape. A ceramic having an appropriate shape such as a bar-like shape can be used. A ceramic having an appropriate shape such as powder shape and granular shape can be also used. Alternatively, a hydrogen generating substance and a mineral substance being present independently from each other such as in a powdery or granular state may be sealed in the pouch container 1 without using a ceramic of a hydrogen generating substance and a mineral substance. A ceramic that supplies weak currents and radiates far infrared rays may be separately sealed in the pouch container 1. This case is preferable for increasing the speed (the rate) of changing purified water to reduced-hydrogen water. Not only a ceramic ball but also powders or hydrates made of platinum or diamond of a nano-colloid state are also preferable for emitting electros by the catalytic action, increasing the speed (the rate) of changing purified water to reduced-hydrogen water, and retaining the reduced hydrogen in the water.

Purified water (beverage) and the ceramic ball 30 can be filled in the pouch container 1 by an appropriate method such as a method of mounting (integrating) the straw 20 having the ceramic ball 30 contained therein to the container main body 1 after filling the container main body 1 with the purified water. The number or material of layers included in the exterior sheet material 40 can be modified as appropriate. The pouch container 1 may contain (be filled with) only a hydrogen generating substance without containing a mineral component. In addition to purified water, examples of a beverage include liquids such as various types of juice, cola, and sport drink, and jellies. An appropriate beverage can be used as long as the beverage contains water component. The pouch container 1 may be a container without the straw 20. For example, the pouch container 1 may be opened by cutting off or tearing a part of the container main body 10. The shape of the pouch container 1 (the container main body 10) can be modified as appropriate. An object of the present invention is not limited to the objects specified herein. Objects of the present invention implicitly include to provide those that have been expressed as actually preferable or advantageous one herein. Further, the present invention can be considered as a filling method into the pouch container 1 as well.

The present invention enables hydrogen water to be drunk easily by using a pouch container.

REFERENCE SIGNS LIST

1 pouch container
10 container main body
20 straw
20*a* one-end opening part
20*b* other-end opening part
20*c* side-surface opening part
21 mouth
22 cap
23 connection part
24 locking member
25 engaging projection
26 engaging claw
30 ceramic ball (a ceramic ball+mineral)
40 exterior sheet material
41 first layer sheet
41A inner sheet
41B outer sheet
42 second layer sheet
43 third layer sheet

The invention claimed is:

1. A pouch container containing a beverage,
   wherein the pouch container is sealed and contains a beverage including at least water and wherein the pouch comprises a hydrogen generating substance which is reactive with water to generate hydrogen gas,
   wherein the pouch container comprises a laminate comprising an exterior sheet having an inner sheet and an outer sheet laminated directly on the outside of the inner sheet, and the laminate further comprises a barrier substrate layer comprising an aluminum foil and disposed on the outside of the exterior sheet,
   wherein the hydrogen generating substance is kneaded into the outer sheet of the laminate, and
   wherein the inner sheet comprises holes configured to not permit liquid water to pass therethrough and permit water vapor to pass therethrough.

2. The pouch container containing a beverage of claim 1, wherein the hydrogen generating substance is a fine powder kneaded into the outer sheet of the laminate.

3. The pouch container containing a beverage of claim 2, wherein the hydrogen generating substance is metal magnesium.

4. The pouch container containing a beverage of claim 1, wherein the inner sheet is the only sheet in the pouch container that is configured to not permit liquid water to pass therethrough and permit water vapor to pass therethrough.

\* \* \* \* \*